Patented Aug. 11, 1931

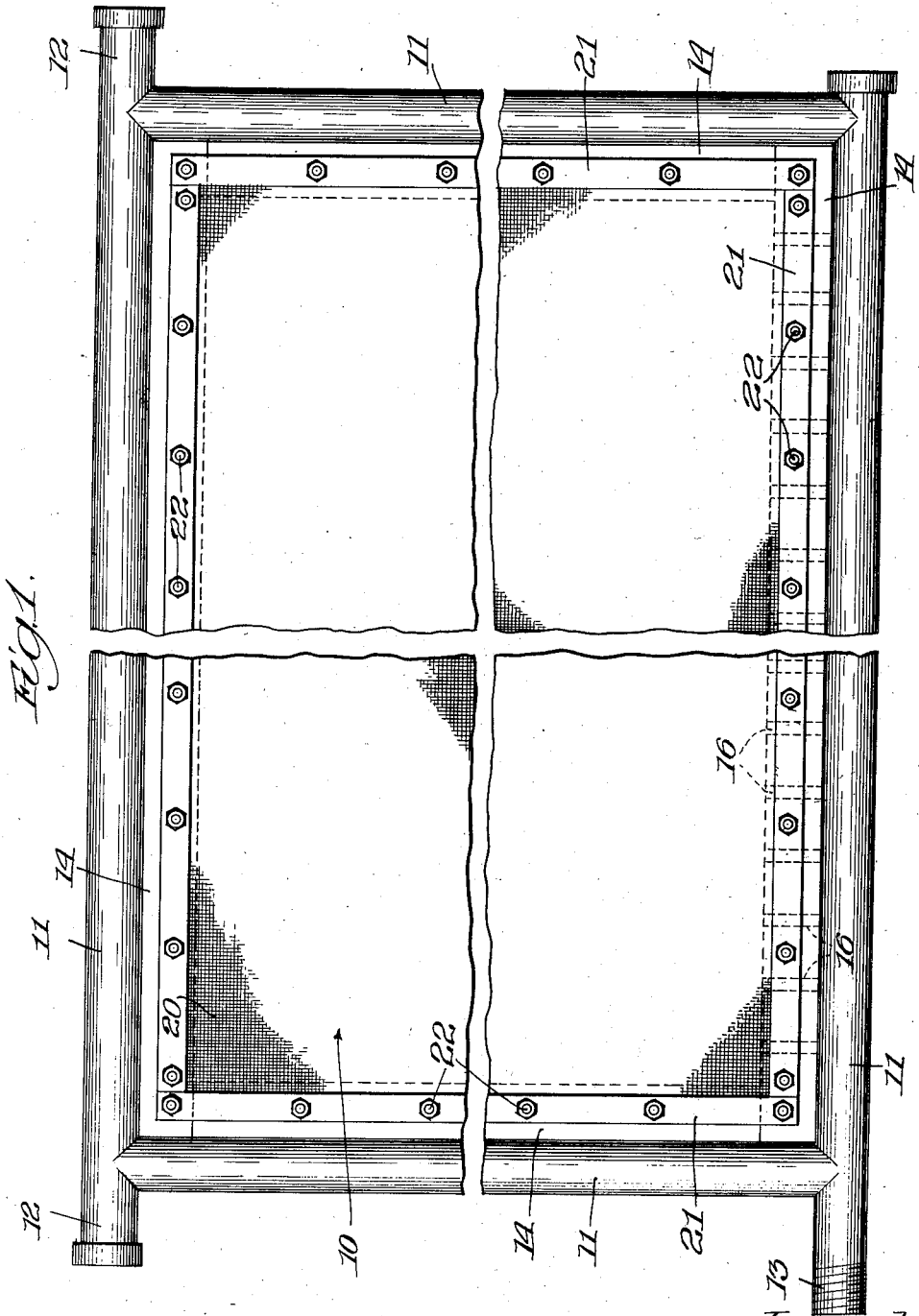

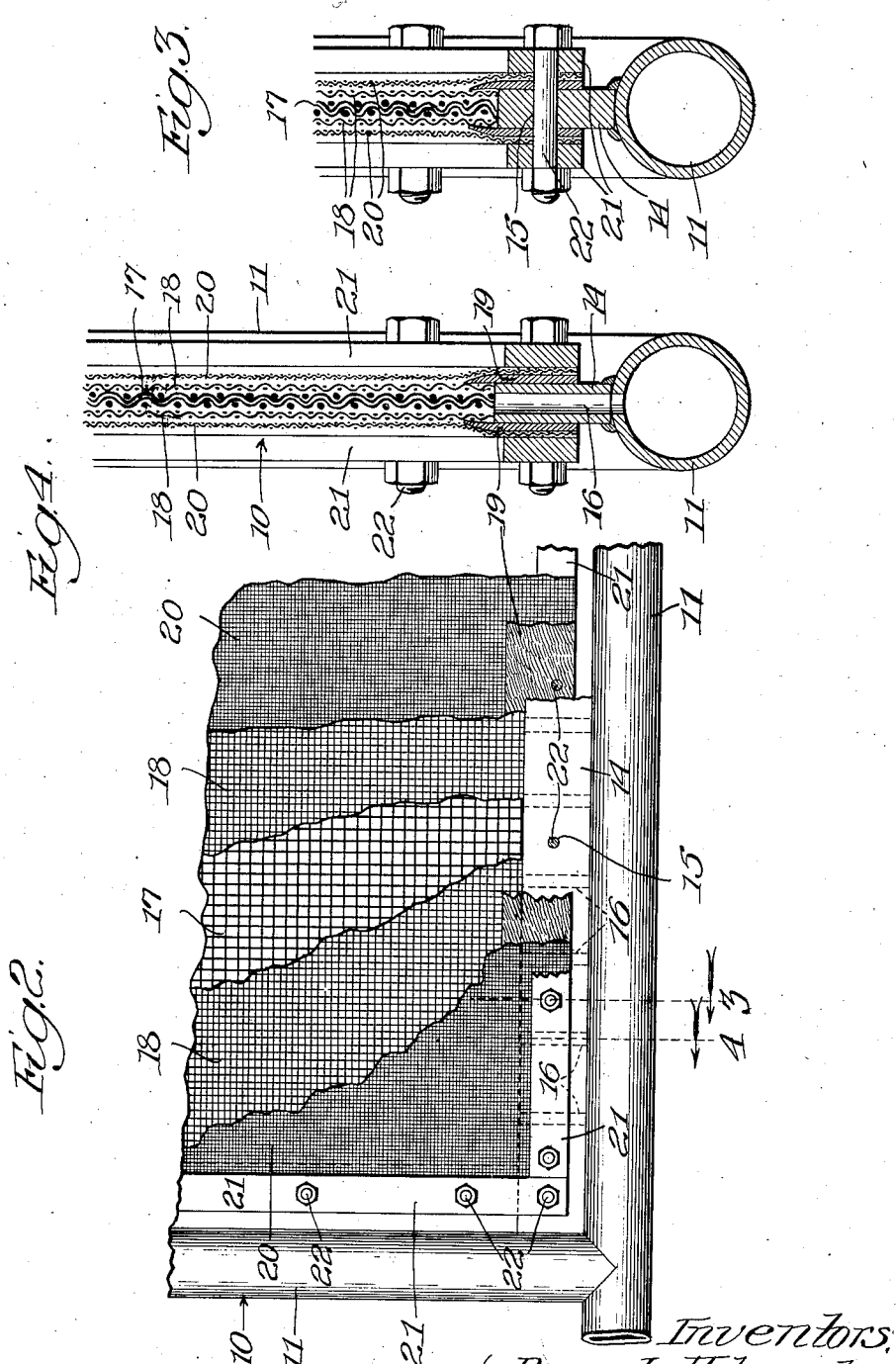

1,818,623

UNITED STATES PATENT OFFICE

ROGER L. HOLCOMB, OF CHESTERTON, AND EDWARD E. BARTELS, OF HAMMOND, INDIANA, ASSIGNORS TO STANDARD OIL COMPANY, OF WHITING, INDIANA, A CORPORATION OF INDIANA

FILTER PRESS LEAF

Application filed April 13, 1928. Serial No. 269,804.

This invention relates to filter press leaves and will be readily understood from the following description of a preferred embodiment thereof in conjunction with the accompanying drawings, in which—

Figure 1 is an elevation of a filter press leaf in accordance with the invention, Fig. 2 is a detail in elevation with various parts broken away to show the construction, Fig. 3 is a sectional view on an enlarged scale on the line 3—3 of Fig. 2, and Fig. 4 is a similar view on the line 4—4 of Fig. 2.

Referring to the drawings, the filter leaf designated generally as 10 comprises an outer frame 11 preferably constituted by pipes welded together as shown in Fig. 1. This frame is provided with projections 12 for supporting it in operative position and with an extension 13, which is screw-threaded or otherwise adapted for attachment with a suitable conduit (not shown) for drawing off filtered liquid. The ends of the pipes constituting said frame are closed except for the extension 13.

On its inside the frame 11 has welded or otherwise integrally attached thereto a frame 14, which is suitably formed from a steel strip of suitable dimensions.

At suitable intervals the frame 14 is provided with bolt-holes 15 and between said bolt-holes openings 16 are drilled from the inner edge of the frame 14 into the pipes constituting the frame 11. Such openings may be drilled through any or all of the sides of the frame 14 but it is satisfactory to locate them exclusively in the lower side thereof as shown in the drawings.

Within the frame 14 are mounted perforate means for supporting the filtering medium or fabric. Such supporting means may comprise a sheet 17 of relatively coarse woven metal, for example 4 mesh, and, located on either side thereof, a sheet 18 of finer woven metal, for example 10 mesh. The sheets 17 and 18 may be attached to the frame 14 by spot-welding at suitable intervals.

On each side, the frame 14 is provided with a gasket 19 of suitable fabric, said gaskets being provided with openings registering with the bolt-holes 15 and extending inwardly of the inner edge of the frame 14 to protect the filter medium from irregularities in the edges of the sheets 18.

A sheet of filtering medium 20 is applied on each side of the leaf so as to rest upon the gaskets 19 and the sheets 18. The sheets 20 of filtering medium are also provided with openings corresponding to the bolt-holes 15.

The sheets 20 are clamped to the leaf by metal strips 21 also provided with perforations corresponding to the bolt-holes 15. Bolts 22 are passed through the bolt-holes 15 and the corresponding openings in the gaskets 19, filter media 20, and metal strips 21, and the nuts thereof are tightened so as to preclude the passage of material into as the interior of the leaf except through the filter media 20. The sheets of filter media thus enclose between them an interior zone through which filtered liquid is adapted to flow.

The filter medium 20 may be of any material suitable for the substances to be filtered. The filter leaf is particularly suitable for filtering hot petroleum tars and residues. When used for this purpose the filter media 20 may be constituted by asbestos or fine metallic wire fabrics and the gaskets 19 may suitably be of asbestos.

It is to be noted that the bolt-holes 15 are independently located with respect to the openings 16 and do not pass through the interior liquid space of the leaf so that there is no danger of leakage of unfiltered liquid along these bolts.

Certain of the features described herein are also described and claimed in a co-pending application of W. E. Bacheldor, Serial No. 382,411.

Although the present invention has been described in connection with the details of a specific embodiment thereof, it is not intended that such details shall be regarded as limitations upon the scope of the invention, except in so far as included in the accompanying claims.

We claim:

1. A filter press leaf comprising a solid frame, filtering media on either side of said frame, means for clamping said media to said frame including bolts passing through holes in said frame, and a conduit adjacent the exterior of a substantial portion of said frame and extending in substantially the same direction as that portion of the frame to which it is adjacent, the portion of said frame adjacent said conduit being provided with a plurality of passages extending therethrough and communicating with said conduit, said passages not coinciding with said bolt-holes and communicating with the interior of the frame and between the filter media thereon.

2. A filter press leaf comprising a solid frame, a conduit extending along one side thereof and attached thereto, said conduit extending in substantially the same direction as the frame side to which it is attached, channels formed in the interior of the side of said frame which is attached to said conduit and extending from the interior of said frame and into said conduit, filter media on either side of said frame, means for attaching said media to said frame including bolts passing through parts of said frame not occupied by said channels.

3. A filter press leaf comprising a tubular frame, a frame of solid metal integrally attached to the interior of said tubular frame, perforate supporting means in said inner frame, filter media located thereon, means for clamping said media to the inner frame including bolts passing through bolt-holes therein, passages extending through the inner frame into said conduit, said passages not coinciding with said bolt-holes, and means for conducting liquid from said tubular frame.

4. A filter press leaf comprising a frame of solid material, a sheet of coarse woven metal secured therein to form a supporting means, filter media located on said supporting means, means for clamping said media to the frame including the bolts carried in bolt holes formed in the frame, a liquid conduit integrally attached to one side of said frame and disposed substantially parallel to the frame side to which it is attached, a series of small passages extending through said frame into said liquid conduit, said bolt holes and passages not coinciding with each other.

5. A filter press leaf comprising a frame of solid metal, perforate supporting means in said frame, filter media located thereon, means for clamping said media to said frame including bolts passing through bolt-holes therein, means for suspending said frame, a conduit extending along one side of said frame substantially parallel thereto, said conduit being closed at one end, and having its other end extending beyond the leaf and provided with coupling means, and passages extending through the frame into said conduit, said passages not coinciding with said bolt-holes.

6. A filter press leaf comprising a solid frame, a hollow tubular frame adjacent said solid frame, filter media on said solid frame, means for securing said filter media to said solid frame including bolts passing through bolt-holes therein, means for conveying filtered liquid from within said solid frame to said tubular frame including passages extending through said solid frame and communicating with said tubular frame, said passages not coinciding with said bolt-holes, and means for conducting liquid from said tubular frame.

7. A filter press leaf comprising a solid frame, a hollow tubular frame surrounding said solid frame, filter media on said solid frame, means for securing said filter media to said solid frame including bolts passing through bolt-holes therein, means for conveying filtered liquid from within said solid frame to said tubular frame including passages extending through said solid frame and communicating with said tubular frame, said passages not coinciding with said bolt-holes, and means for conducting liquid from said tubular frame.

ROGER L. HOLCOMB.
EDWARD E. BARTELS.